United States Patent
Baake et al.

(10) Patent No.: US 8,027,173 B2
(45) Date of Patent: Sep. 27, 2011

(54) APPARATUS FOR PROVIDING AC VOLTAGE

(76) Inventors: Michael Baake, Bielefeld (DE);
Michael Pavischitz, Waldems (DE)

( * ) Notice: Subject to any disclaimer, the term of this patent is extended or adjusted under 35 U.S.C. 154(b) by 529 days.

(21) Appl. No.: 12/182,914

(22) Filed: Jul. 30, 2008

(65) Prior Publication Data
US 2009/0039926 A1 Feb. 12, 2009

(30) Foreign Application Priority Data
Aug. 7, 2007 (EP) .................................... 07015529

(51) Int. Cl.
*H02K 47/22* (2006.01)
*H02M 7/08* (2006.01)

(52) U.S. Cl. ................. 363/9; 363/69; 363/71; 363/164; 363/165

(58) Field of Classification Search .................. 363/157, 363/165, 9, 15, 16, 17, 65, 67, 69, 71, 164; 327/102, 105
See application file for complete search history.

(56) References Cited

U.S. PATENT DOCUMENTS

| | | | | |
|---|---|---|---|---|
| 4,772,994 A | * | 9/1988 | Harada et al. | 363/8 |
| 5,425,704 A | * | 6/1995 | Sakurai et al. | 604/22 |
| 5,731,969 A | * | 3/1998 | Small | 363/126 |

FOREIGN PATENT DOCUMENTS

| | | |
|---|---|---|
| JP | 58103013 A | 6/1983 |
| JP | 5121976 | 5/1993 |
| JP | 9023656 | 1/1997 |
| JP | 2000253664 A | 9/2000 |
| JP | 2001036364 A | 2/2001 |
| SU | 1046876 A | 10/1983 |
| SU | 1690146 A1 | 11/1991 |

OTHER PUBLICATIONS

Pontt, et al, Operation of High Power Cycloconverter-Fed Gearless Drives under Abnormal Conditions, Conference Record of the 2004 Industry Application Conference 39th IAS Annual Meeting, Oct. 3-7, 2004, pp. 1083-1089, vol. 2, IEEE, Piscataway, NJ, USA.
Lander, Cyril W., Power Electronics, 1993, pp. 181-191, McGraw Hill, Berkshire, England.

* cited by examiner

*Primary Examiner* — Gary L Laxton
(74) *Attorney, Agent, or Firm* — IP Strategies

(57) ABSTRACT

An apparatus for providing an AC voltage includes a synthesizer for generating at least one periodic output voltage signal, each periodic output voltage signal having an output frequency. The synthesizer is supplied by an input AC voltage having an input frequency, and is configured such that each output frequency differs from the input frequency.

17 Claims, 2 Drawing Sheets

APPARATUS FOR PROVIDING AC VOLTAGE

FIELD OF THE INVENTION

The invention is directed to an apparatus for providing an AC voltage and an apparatus for DC voltage power supply, in particular, for driving electronics circuitry.

BACKGROUND OF THE INVENTION

Various AC or DC operated electronics circuitry, such as high-quality audio equipment or sensitive measuring instruments, face increasing problems from external signal influences (particularly wire-bound from the AC mains supply but also wireless from all sorts of HF signals). At the same time, due to progress in circuit understanding and parts availability, higher performance equipment could be built—if there were a matching improvement in the power supplies.

However, common switching power supplies provide unwanted interfering signals, while traditional linearly regulated power supplies, both serial and shunt versions, have limited performance. Also, particularly in high-end audio, prior art designs have degrading effects on sound quality.

Attempts are known to use shielding techniques together with a rechargeable battery approach to overcome the above-mentioned drawbacks. However, such devices are costly to build and are not very suitable for instruments in continuous use or with a significant power demand.

BRIEF SUMMARY OF THE INVENTION

In view of the above, it is the object of the present invention to overcome the prior art drawbacks and to provide an apparatus for providing an AC voltage showing reduced disturbances. This problem is solved by an apparatus according to claim 1.

Accordingly, an apparatus for providing an AC voltage is provided, comprising:
synthesizer means for generating at least one periodic output voltage signal, each periodic output voltage signal having an output frequency, wherein the synthesizer means is supplied by an input AC voltage having an input frequency, wherein the synthesizer is configured such that each output frequency differs from the input frequency.

Due to the use of a separate synthesizer means, the resulting periodic output voltage signals which may be used, possibly after a suitable amplification, as AC voltage power supply, are decoupled from the mains power supply. In view of the output signals having a frequency differing from the frequency of the power supply, resonance effects are reduced.

In the simplest case, exactly one periodic output voltage signal is generated. However, depending on the desired use, more than one periodic output voltage signal may be generated. In principle, the periodic output voltage signals may have an arbitrary form. Preferably, the periodic output voltage signals each have the same frequency and/or amplitude. In particular, each periodic output voltage signal may have only one frequency; in other words, no other frequency components (such as harmonics) may be present.

The synthesizer means may comprise an oscillator, in particular, an RC oscillator. This oscillator may be tuned such that a desired output frequency is obtained. In principle, the signals may be generated (or created) in a digital or an analog way. Particularly in the case of an analog generation, lower EMI emission may be achieved.

The synthesizer may be configured such that each output frequency is incommensurate with the input frequency. In other words, the ratio of the output frequency to the input frequency is an irrational value. In this way, a particularly advantageous decoupling of the generated periodic output voltage signals from the driving frequency is achieved so that the mains frequency and any potential harmonics are suppressed to a large extent. Possibly, the irrational ratio may be approximated by an approximately irrational ratio (e.g. a rational approximant) that deviates from the irrational value by an amount of at most about 2%, preferably of at most about 1%; in other words, the difference between the irrational value and the approximately irrational value is smaller than or equal to about 2%, preferably smaller than or equal to about 1%, of the irrational value. Thus, by an output frequency being incommensurate with the input frequency, also the case of an approximate incommensurability should be encompassed; i.e. a deviation of an approximately irrational value from the irrational value of at most about 2%, preferably of at most about 1%, may also fall hereunder.

In principle, the synthesizer means may be configured (e.g., the oscillator may be tuned correspondingly) to provide an arbitrary irrational ratio of output frequency and input frequency. For example, this ratio may be equal to a transcendental number such as $\pi$. Alternatively, the ratio of each output frequency to the input frequency may be an irrational algebraic number, in particular, a quadratic irrationality. An irrational algebraic number is an irrational number that is a root of an irreducible polynomial with integer coefficients. A quadratic irrationality is a root of an irreducible quadratic polynomial with integer coefficients. Examples of quadratic irrationalities are the golden ratio $\tau=(1+\sqrt{5})/2$ and the silver ratio $\sqrt{2}$.

Possibly, the irrational algebraic number may be approximated by an approximate irrational algebraic number (e.g. a rational approximant) that deviates from the irrational algebraic number by an amount of at most about 2%, preferably of at most about 1%; in other words, the difference between the irrational algebraic number and the approximately irrational algebraic number is smaller than or equal to about 2%, preferably smaller than or equal to about 1%, of the irrational value. Thus, by a ratio being an irrational algebraic number also the case of an approximate irrational algebraic number should be encompassed.

The synthesizer means may comprise a voltage-controlled amplifier. In this way, the gain of the output signals may be controlled in an advantageous way.

In particular, the described apparatus may comprise a feedback circuitry for controlling the voltage-controlled amplifier based on the at least one periodic output voltage signal. For this purpose, the feedback circuitry may comprise a transformer, such as a low-power transformer.

In the apparatuses described above, the synthesizer means may be supplied by AC mains power. Thus, an advantageous decoupling from any interference signals stemming from the mains power, particularly by suppression of AC mains frequency and potential harmonics of it, may be achieved.

The above-described apparatuses may further comprise amplifier means for amplifying each of the periodic output voltage signals. Thus, independent of the power of the periodic output voltage signals, a desired power of the resulting AC voltage may be achieved. Due to the output signals having a frequency differing from the frequency of the power supply, a decoupling with respect to the power supply of the amplifiers (such as mains power) is obtained as well.

The above-described apparatuses may further comprise transformer means for transforming the voltage of each periodic output voltage signal. Hence, a wanted AC voltage may be obtained.

The invention further provides an apparatus for DC voltage power supply, comprising:

an apparatus for providing an AC voltage as described above, and rectifier means for rectifying the at least one periodic output voltage signal to obtain a DC output voltage.

Due to the decoupling of the periodic output voltage signal generated by the synthesizer means, also the resulting DC output voltage shows a suppression of interference signals due to the driving input AC voltage power supply, such as the mains power.

Particularly in such a case, the synthesizer means may be configured to generate a predetermined number of periodic output voltage signals, wherein each periodic output voltage signal may be shifted with respect to another of the periodic output voltage signals by a phase given by the period of the periodic output voltage signals divided by the predetermined number. In this case, it is advantageous if the periodic output voltage signals all have the same period (wavelength) or frequency.

In principle, there may be an arbitrary number of periodic output voltage signals, particularly an arbitrary odd number of periodic output voltage signals. For example, the synthesizer means may be configured to generate three periodic output voltage signals with the same frequency or wavelength, wherein the periodic output voltage signals are shifted with respect to each other by one third of the wavelength or period.

Due to such a three phase topology, the resulting DC voltage does not drop below $\sqrt{3}/2$ of the peak voltage.

In principle, the apparatus for DC voltage power supply is not restricted to the case of using a synthesizer means supplied by an input AC voltage as described above. Instead, the synthesizer may alternatively be supplied by an input DC voltage. Such a DC voltage may stem, for example, from a solar cell or a rechargeable battery. In other words, the invention also provides an apparatus for DC voltage power supply, comprising synthesizer means for generating at least one periodic output voltage signal, each periodic output voltage signal having an output frequency, and rectifier means for rectifying the at least one periodic output voltage signal to obtain a DC output voltage, wherein the synthesizer means is configured to generate a predetermined number of periodic output voltage signals such that each output frequency differs from the input frequency, wherein each periodic output voltage signal is shifted with respect to another of the periodic output voltage signals by a phase given by the period of the periodic output voltage signals divided by the predetermined number.

In the above-described apparatuses, the synthesizer means may be configured such that each periodic output voltage signal is based on a sinusoidal form. In particular, each periodic output voltage signal may be based on or equal to a sine function having a predetermined amplitude, frequency (or wavelength) and phase.

The synthesizer means may be configured such that each periodic output voltage signal has a truncated sinusoidal form. In other words, the periodic output voltage signals may have a sinusoidal form being restricted to a predetermined amplitude threshold. For example, each periodic output voltage signal may correspond to the sign of a sine function times the minimum of the absolute value of the sine function and a predetermined threshold value. In the case of three periodic output voltage signals, for example, the predetermined threshold value may be equal to $\sqrt{3}/2$. In such a case, after rectifying, the resulting DC voltage, in the ideal case, does not show fluctuations anymore.

The synthesizer means may be configured to generate three sinusoidal output signals being shifted with respect to each other by one third of the period. In particular, the synthesizer means may be configured to generate three truncated sinusoidal output signals, e.g. being truncated at $\sqrt{3}/2$ of the respective amplitude.

The above-described apparatuses may further comprise a voltage-controlled amplifier and a feedback circuitry for controlling the voltage-controlled amplifier based on the DC output voltage. In particular, the feedback circuitry may comprise averaging means for averaging the DC output voltage. In this way, for the purpose of the feedback control, a smoothing of the DC voltage is achieved; thus, a slow feedback control may be obtained.

The rectifier means may comprise one or more bridge rectifiers, such as those built by Schottky diodes. The above-described apparatuses may further comprise high-capacity filtering means, for example, comprising electrolytic capacitors.

The above-described apparatuses may be used for driving audio devices or measuring instruments.

The invention further provides a method for providing an AC voltage, comprising:

generating at least one periodic output voltage signal using a synthesizer means, each periodic output voltage signal having an output frequency, wherein the synthesizer means is supplied by an input AC voltage having an input frequency, wherein each periodic output voltage signal is generated such that each output frequency differs from the input frequency.

The method for providing an AC voltage may be configured analogously to the case of the above-described apparatus for providing an AC voltage. For example, each output frequency may be incommensurate with the input frequency (as outlined above).

The invention further provides a method for power supply with a DC voltage, comprising performing the previously described method, and rectifying the at least one periodic output voltage signal to obtain a DC output voltage. This method may be configured analogously to the case of the above-described apparatus for DC voltage power supply.

For example, in this method, the generating step may comprise generating a predetermined number of periodic output voltage signals, wherein each periodic output voltage signal is shifted with respect to another of the periodic output voltage signals by a phase given by the period of the periodic output voltage signals divided by the predetermined number.

The invention also provides a computer program product comprising one or more computer readable media having computer-executable instructions for performing the steps of the method of one of the preceding claims when run on a computer.

BRIEF DESCRIPTION OF THE DRAWINGS

Further features and advantages will be described in the following with respect to the examples and Figures.

DETAILED DESCRIPTION OF THE INVENTION

Figure 1:
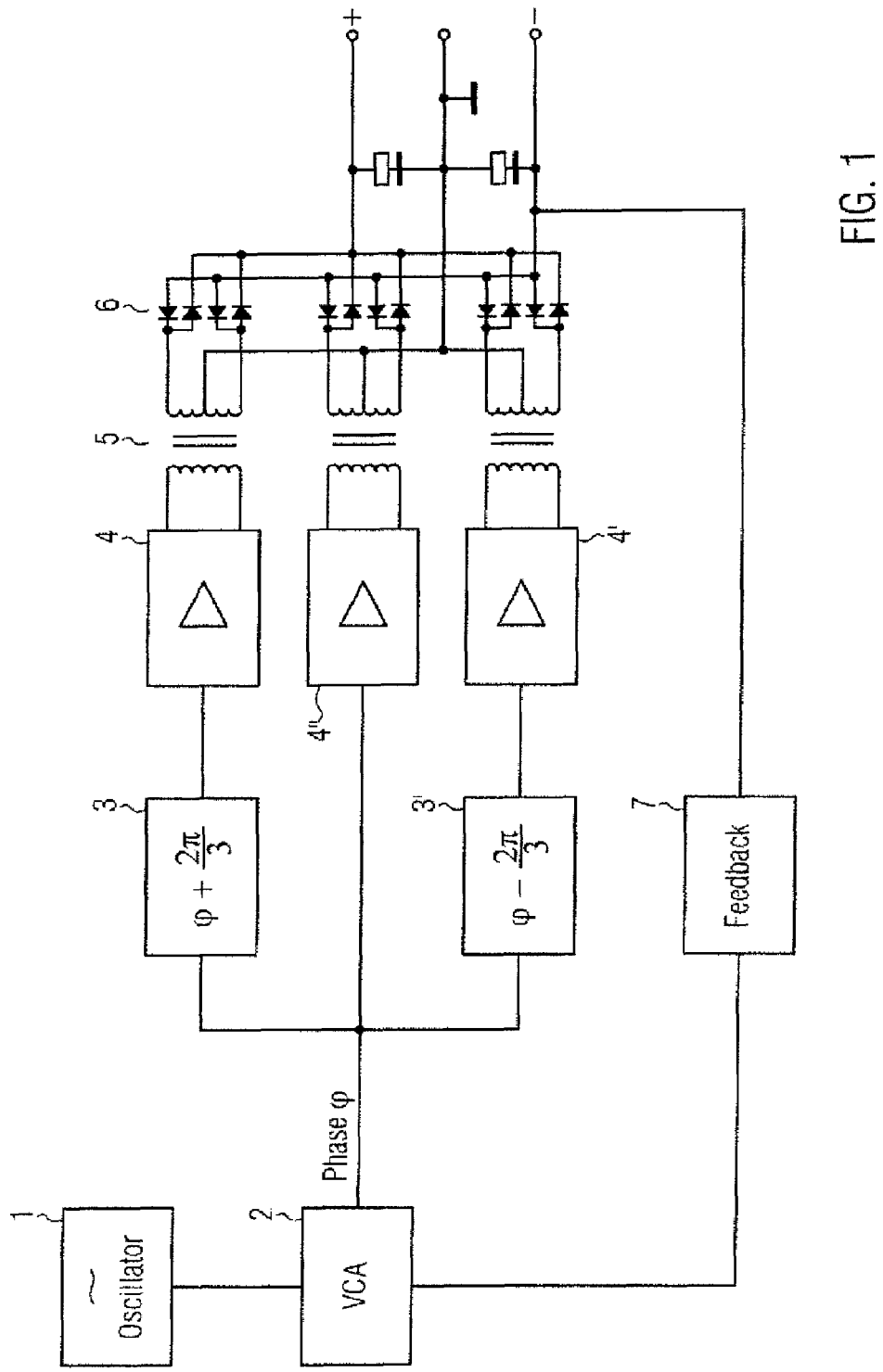
FIG. 1 illustrates a simplified diagram of the structure of an example of an apparatus for DC voltage power supply.

In FIG. 1, a simplified diagram of an example of an apparatus for DC voltage power supply having a three-phase structure is illustrated. A periodic output voltage signal is generated by a synthesizer means comprising an oscillator 1. The synthesizer means and, thus, also the oscillator, may be supplied by AC mains voltage. In such a case, the AC voltage has a predetermined frequency, such as 50 or 60 Hz.

The oscillator may be in the form of an RC oscillator which is tuned to generate a predefined periodic signal having a predefined frequency which differs from the input frequency of the power supply voltage. The periodic signal, in particular, may be a sine signal with a predetermined amplitude, wavelength and phase.

The periodic output voltage signal is fed to a voltage-controlled amplifier which allows to control the gain, particularly based on feedback signals.

After the voltage-controlled amplifier 2, the signal path is split into three branches, two of which having phase-shifting means 3 and 3'. The phase-shifting means 3 and 3' may be provided in the form of all-pass filters. In the case of a three-phase structure as is illustrated in the example of FIG. 1, three signals being shifted with respect to each other by ⅓ of their period are to be obtained. In other words, in the case of a periodic output voltage signal having a period of $2\pi$, the all-pass filters perform a phase-shift of $+2\pi/3$ and $-2\pi/3$, respectively. In this way, three periodic output voltage signals differing only in their phase are obtained.

The periodic output voltage signals are then input to amplifiers 4, 4' and 4". The amplifiers may be linear amplifiers, preferably in bridged mode, to decouple as much as possible from the primary ground. The amplifiers are supplied by a conventional, preferably high-quality, DC power supply which may be regulated or unregulated depending on the application. For further improvement, this power supply may be separated from the other circuitry, for example, by housing it in an extra case. The amplifiers may have a wide bandwidth such as larger than 50 kHz, in particular, about 100 kHz.

The amplified signals are then transformed via transformer means 5 to produce a desired AC voltage and improve isolation at the same time. The transformer means 5 are followed by rectifier means 6 to yield a DC voltage. Using transformers with symmetric voltages on the secondary side as shown, one can use fast discrete bridge rectifiers (e.g., built from high-speed, low emission Schottky diodes) to obtain an unfiltered symmetrical DC voltage. Other constellations for single or multiple voltages are possible as well.

Via a feedback circuitry 7, the DC voltage level may be compared with a reference voltage to provide feedback signals to the signal generator, thus keeping the DC voltage within a small window, prior to any further filtering or regulation. The feedback circuitry may comprise averaging means so as to have a slow feedback. It is to be noted that the averaged DC voltage can be controlled independently of any potential regulation or stabilization afterwards.

The resulting DC voltage may undergo additional filtering such as high-capacity filtering using high-quality electrolytic capacitors of low ESR. For example, electrolytic capacitors may be used with an internal resistance of less than 10 m$\Omega$ up to 1 MHz or more.

For circuitry with a high-intrinsic PSRR, this approach is often superior to a regulated version. In particular, any action of serial or shunt regulators happens in interaction with the load so that the regulator response is strongly correlated with the behavior of the load. In the example of an audio amplifier circuit as the load, this dependence may result in a noticeable degrade in sound quality.

In the above-described example, an advantageous decoupling from a power supply such as AC mains is achieved by generating periodic output voltage signals having incommensurate (or approximately incommensurate) frequencies compared to the case of the supply frequency of the synthesizer and the amplifier means.

As an example, the ratio may be given by the golden ratio, $\tau = (1+\sqrt{5})/2$ which has the continued fraction expansion $\tau = [1; 1, 1, 1, 1, 1, \ldots]$. This expansion, when viewed as a sequence of approximating rational numbers, converges slower than any other continued fraction, so that the golden ratio is the most irrational number in this sense. The decoupling effect is thus maximal. In view of this, a strong decoupling is also achieved if the ratio is given by a rational approximant of the golden ratio, preferably that differs from $\tau$ by 1% or less.

Each real number x can be represented as a regular continued fraction (see also E. Zeidler, "Teubner—Taschenbuch der Mathematik", page 730 et seqq., Second Edition 2003, Teubner, Wiesbaden)

$$x = [a_0; a_1, a_2, a_3, \ldots] = a_0 + \cfrac{1}{a_1 + \cfrac{1}{a_2 + \cfrac{1}{a_3 + \cfrac{1}{\cdots}}}},$$

where $a_0$ is an integer and all other $a_i$ are positive integers. There can be finitely or infinitely many of them. Finite continued fractions are rational numbers, while periodic or ultimately periodic ones represent quadratic irrationalities (meaning roots of irreducible quadratic polynomials with integer coefficients). Well-known examples are $$\tau = \frac{1+\sqrt{5}}{2} = [1; 1, 1, 1, \ldots] \text{ and } \sqrt{2} = [2; 2, 2, 2, \ldots],$$

known as the golden and the silver ratio, respectively. Both belong to the family of noble numbers.

A relevant property of the continued fraction of a number x is the implicit coding of optimal rational approximants to x. If $x = [a_0; a_1, a_2, a_3, \ldots]$ as above, the finite approximant $$x_n = [a_0; a_1, a_2, \ldots, a_{n-1}, a_n] = \frac{A_n}{B_n}$$

is a rational number, automatically in its reduced form. The approximation theorem of Lagrange now states that $$|x - x_n| = \left|x - \frac{A_n}{B_n}\right| < \frac{1}{B_n^2}$$

which, together with some further properties of the continued fractions, also implies that the approximation ratio $A_n/B_n$ is essentially optimal among all rational numbers P/Q with $0 < Q \leq B_n$.

This property quantifies how "irrational" a given number is, via the convergence rate of the regular continued fraction. The slowest possible convergence occurs for the golden ratio from above. Its sequence of approximants reads $$\frac{2}{1}, \frac{3}{2}, \frac{5}{3}, \frac{8}{5}, \frac{13}{8}, \frac{21}{13}, \frac{34}{21}, \frac{55}{34}, \ldots$$

where each fraction is the quotient of two consecutive Fibonacci numbers. The numerical value of the golden ratio is $\tau \cong 1,61803 \ldots$.

Transcendental numbers (such as $\pi$ or e) also possess infinite continued fractions, but with a rather rapid convergence. This relates to the fact that many transcendental numbers can be approximated exceptionally well by rational numbers, while the irrational algebraic numbers do not show this behaviour. Thus, for the present application, one profits most from quadratic irrationalities.

The periodic output voltage signals used in the above-described examples, preferably may be sinusoidal signals. According to a particular example, truncated sine signals being clipped at a predetermined threshold may be used. Particularly in the case of three periodic output voltage signals, sine signals being clipped at $\sqrt{3}/2$ of their peak value or amplitude may be used to obtain a perfect DC signal after the rectification under the assumption that the amplifier/transformer/rectifier system is ideal.

For simplicity, in the following, the situation for a signal of period $2\pi$ is described; however, the statements transfer to other situations. The simplest signal is $\sin(t)$, which coincides with its own Fourier series (no harmonics present). When put through a perfect rectifier, one obtains $$|\sin(t)| = \frac{2}{\pi} - \frac{4}{\pi} \sum_{k=1}^{\infty} \frac{\cos(2kt)}{(2k-1)(2k+1)}$$

which is a signal with a significant amount of harmonics (see also the above-mentioned handbook by E. Zeidler). Quantitatively, only $$\frac{8}{\pi^2} \cong 81\%$$

of the power is coming from the constant term.

More favourable is the outcome of an ideal rectification of a three-phase signal, which is given by $$\max\left\{|\sin(t)|, \left|\sin\left(t+\frac{2\pi}{3}\right)\right|, \left|\sin\left(t+\frac{4\pi}{3}\right)\right|\right\} = \frac{3}{\pi} - \frac{6}{\pi} \sum_{k=1}^{\infty} \frac{\cos(6kt)}{(6k-1)(6k+1)}$$

which shows less harmonics than the previous case, the constant term comprising the fraction $$\frac{36}{\pi(3\sqrt{3}+2\pi)} \cong 99.8\%$$

of the power spectrum this time.

Figure 3:
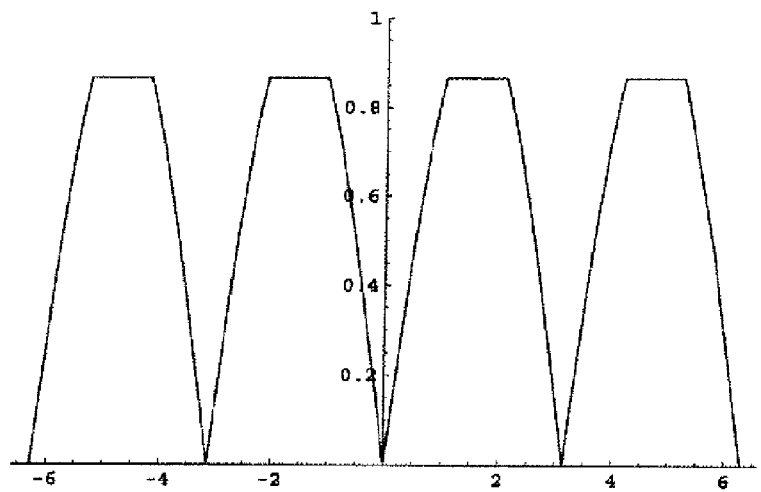

Finally, taking the truncated sine signal as $$f(t) = \text{sgn}(\sin(t)) \min\left(|\sin(t)|, \frac{\sqrt{3}}{2}\right)$$

which is illustrated in FIG. 3, one finds the Fourier series $$f(t) = \frac{3\sqrt{3}+4\pi}{6\pi}\sin(t) + \frac{2\sqrt{3}}{\pi}\sum_{k=1}^{\infty}\frac{\sin((6k-3)t)}{(6k-4)(6k-3)(6k-2)} -$$

$$\frac{\sqrt{3}}{\pi}\sum_{k=1}^{\infty}\frac{\sin((6k-1)t)}{(6k-1)(6k-2)} + \frac{\sqrt{3}}{\pi}\sum_{k=1}^{\infty}\frac{\sin((6k+1)t)}{(6k+1)(6k+2)}$$

which is converging uniformly (hence it is free of overshooting as known from square signals) and rather rapidly (meaning that a limited bandwidth already reproduces it well). An ideal rectification of the three phase version results in $$\max\left\{|f(t)|, \left|f\left(t+\frac{2\pi}{3}\right)\right|, \left|f\left(t+\frac{4\pi}{3}\right)\right|\right\} = \frac{\sqrt{3}}{2},$$

which is a pure DC signal due to exact cancellation of all harmonics.

Figure 2:
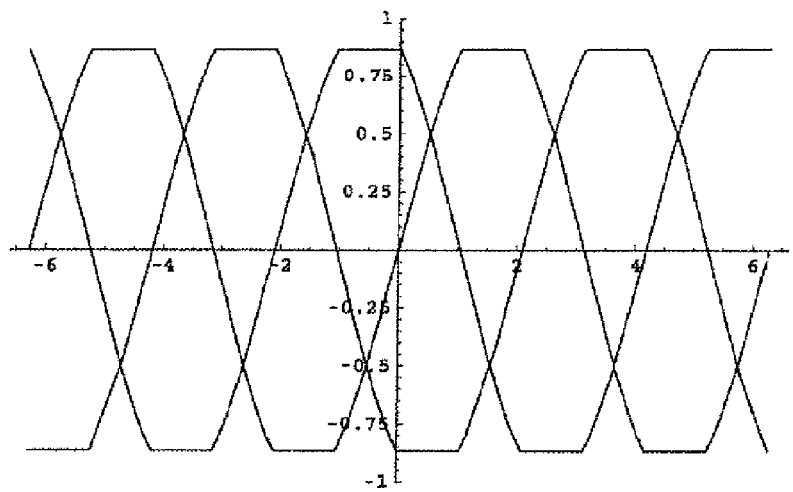
FIG. 2 to 4 illustrate schematically examples of signals used in an apparatus as in FIG. 1.
Figure 4:
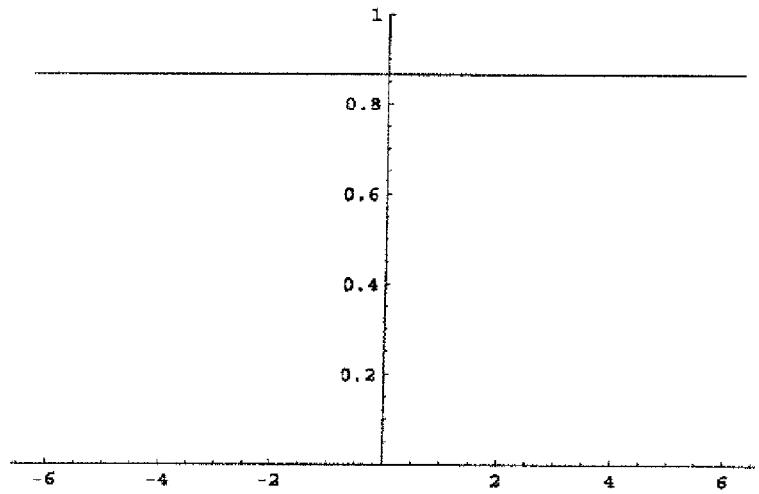

The curves of the underlying functions $$f(t), f\left(t+\frac{2\pi}{3}\right) \text{ and } f\left(t+\frac{4\pi}{3}\right)$$

are illustrated in FIG. 2. Taking the absolute value $|f(t)|$ yields a curve as shown in FIG. 3. The resulting constant function $\sqrt{3}/2$ without any harmonics is illustrated in FIG. 4.

Although the above corresponds to an ideal system, due to the rather rapid convergence of the Fourier series involved, one comes very close to a pure DC signal by using only a slightly bandwidth-restricted signal—even without any capacitive filtering at all. In practice, with a straightforward realization as illustrated in FIG. 1 (but even without the feedback loop), one can realize a practically load independent effective hum of less than 1% of the output voltage.

To generate the various signals, be it a single or triple phase sine signal or a truncated version, several approaches are possible, both digital and analog. The analog way may be preferred because of lower EMI emission. Another approach is joining the generator part and the amplifier into one stage, which could then work in switching mode.

In the example illustrated in FIG. 1, the clipping of a sine signal output by oscillator 1 may be performed before the sine signal is fed to the voltage-controlled amplifier 2. However, instead of this, the oscillator 1 may be replaced by a three phase-oscillator with a VCA which directly outputs the desired phase-shifted and truncated sine signals.

The decoupling of the power supply from mains power as illustrated in FIG. 1 also works with a single-phased signal. This is particularly useful if a single AC voltage being decoupled from mains inferences is required. This applies, for example, to equipment that runs on AC such as 115 V or 230 V AC, but which requires only a moderate amount of power, such as electrostatic loudspeakers.

For such a case, the example illustrated in FIG. 1 has to be modified in the following way. The two phase shifting branches and the rectifier part is to be removed. Instead, the secondary voltage is set to the desired AC output voltage such as 115 or 230 V. For controlling the synthesizer means, an averaged feedback signal may be derived using an additional low power transformer (for example, at 0.3 W).

Particularly if the power consumption of the load is small or moderate, the apparatus as illustrated in FIG. 1 or with the modification described above may be run from a rechargeable battery. In this case, preferably, a tailored capacitor network is to be connected in parallel. The rechargeable battery could be fed either from a solar cell of from AC mains, with the option to switch it off completely for periods of critical use (such as listening for audio amplifiers).

Although the above embodiments have been described using the example of a simple sine function, it is to be understood that the parameters such as amplitude, wavelength and phase as well as the periodic function itself may be chosen differently.

The apparatuses described above may be used, for example, in the field of audio electronics, such as amplifiers, D/A converters, etc. Alternatively, other sensitive electronics, such as measuring instruments and other analog or digital circuitry, may use a power supplied in such a way.

It is to be understood that the features outlined in the context of the examples may also be combined in different ways and are to be construed as illustrative only.

The invention claimed is:

1. Apparatus for DC voltage power supply, comprising:
   an apparatus for providing an AC voltage output, comprising synthesizer means for generating one or more periodic output voltage signals, each said periodic output voltage signal having an output frequency, wherein the synthesizer means is supplied by an input AC voltage having an input frequency, wherein the synthesizer is configured such that each said output frequency differs from the input frequency, and
   rectifier means for rectifying the periodic output voltage signals to obtain a DC output voltage,
   wherein the synthesizer means is configured to generate a predetermined number of the periodic output voltage signals, wherein each said periodic output voltage signal is shifted with respect to another of the periodic output voltage signals by a phase given by the period of the periodic output voltage signals divided by the predetermined number.

2. Apparatus according to claim 1, wherein the synthesizer means is configured such that each said output frequency is incommensurate with the input frequency.

3. Apparatus according to claim 1, wherein the ratio of each said output frequency to the input frequency is an irrational algebraic number.

4. Apparatus according to claim 3, wherein the ratio of each said output frequency to the input frequency is a quadratic irrationality.

5. Apparatus according to claim 1, wherein the synthesizer means comprises a voltage-controlled amplifier.

6. Apparatus according to claim 5, further comprising feedback circuitry for controlling the voltage-controlled amplifier based on the one or more periodic output voltage signals.

7. Apparatus according to claim 1, wherein the synthesizer means is supplied by AC mains power.

8. Apparatus according to claim 1, further comprising amplifier means for amplifying each said at least one periodic output voltage signal.

9. Apparatus according to claim 1, further comprising transformer means for transforming the voltage of each said periodic output voltage signal.

10. Apparatus according to claim 1, wherein the synthesizer means is configured such that each said periodic output voltage signal is based on a sinusoidal form.

11. Apparatus according to claim 1, wherein the synthesizer means is configured such that each said periodic output voltage signal has a truncated sinusoidal form.

12. Apparatus according to claim 11, wherein the synthesizer means is configured to generate three truncated sinusoidal output signals being truncated at $\sqrt{3}/2$ of the respective amplitude.

13. Apparatus according to claim 1, wherein the synthesizer means is configured to generate three sinusoidal output signals being shifted with respect to each other by one third of the period.

14. Apparatus according to claim 1, comprising a voltage-controlled amplifier and feedback circuitry for controlling the voltage-controlled amplifier based on the DC output voltage.

15. Method for power supply with a DC voltage, comprising:
   providing an AC voltage, comprising generating one or more periodic output voltage signals using synthesizer means, each said periodic output voltage signal having an output frequency, wherein the synthesizer is supplied by an input AC voltage having an input frequency, wherein each said periodic output voltage signal is generated such that each said output frequency differs from the input frequency, and
   rectifying the at least one periodic output voltage signal to obtain a DC output voltage
   wherein generating the at least one periodic output voltage signal comprises generating a predetermined number of the periodic output voltage signals, wherein each said periodic output voltage signal is shifted with respect to another of the periodic output voltage signals by a phase given by the period of the periodic output voltage signals divided by the predetermined number.

16. Method according to claim 15, wherein each said output frequency is incommensurate with the input frequency.

17. A non-transitory computer-readable storage medium comprising one or more computer-coded segments that, when executed by a computer system, cause the computer system to carry out the method of claim 15.

* * * * *